(12) United States Patent
Lvovskiy et al.

(10) Patent No.: US 8,786,846 B2
(45) Date of Patent: Jul. 22, 2014

(54) METHOD FOR DETERMINATION OF HEAD POSITION RELATIVE TO RECTANGULAR AXES FOR OBSERVER EQUIPPED WITH HEAD-MOUNTED MODULE

(76) Inventors: Matvey Lvovskiy, Brooklyn, NY (US); Alexander Efros, Sanct Petersburg (RU); Sofya Volfson, Brooklyn, NY (US); Simon Iokhvidson, Brooklyn, NY (US)

( * ) Notice: Subject to any disclaimer, the term of this patent is extended or adjusted under 35 U.S.C. 154(b) by 76 days.

(21) Appl. No.: 13/507,492

(22) Filed: Jul. 5, 2012

(65) Prior Publication Data
US 2014/0009367 A1    Jan. 9, 2014

(51) Int. Cl.
*G01B 11/26* (2006.01)
*G02B 27/01* (2006.01)

(52) U.S. Cl.
CPC ..................................... *G02B 27/017* (2013.01)
USPC ..................................................... 356/139.03

(58) Field of Classification Search
CPC ... G06F 3/012; G06F 3/0325; G02B 27/0093; G02B 27/017; G09G 2380/12
USPC ........................ 345/8; 348/E13.051; 382/103; 356/139.03
See application file for complete search history.

(56) References Cited

U.S. PATENT DOCUMENTS

| | | | |
|---|---|---|---|
| 3,917,412 A | 11/1975 | Stoutmeyer | |
| 3,923,370 A | 12/1975 | Mostrom | |
| 4,028,725 A | 6/1977 | Lewis | |
| 4,081,209 A | 3/1978 | Heller et al. | |
| 4,722,601 A | 2/1988 | McFarlane | |
| 4,755,023 A | 7/1988 | Evans et al. | |
| 4,761,056 A | 8/1988 | Evans et al. | |
| 4,808,064 A * | 2/1989 | Bartholet | 356/139.03 |
| 4,896,962 A * | 1/1990 | Menn et al. | 356/139.03 |
| 5,576,887 A | 11/1996 | Ferrin et al. | |
| 5,717,414 A | 2/1998 | Bergsneider et al. | |
| 5,844,674 A | 12/1998 | Sieben | |
| 5,884,239 A | 3/1999 | Romanik, Jr. | |
| 5,926,264 A | 7/1999 | Beale | |
| 6,179,246 B1 | 1/2001 | Fisel et al. | |
| 6,215,269 B1 | 4/2001 | Gregg et al. | |
| 6,926,429 B2 | 8/2005 | Barlow et al. | |
| 7,522,344 B1 | 4/2009 | Curatu et al. | |
| 7,542,210 B2 | 6/2009 | Chirieleison | |
| 7,791,809 B2 | 9/2010 | Filipovich et al. | |
| 7,928,927 B1 | 4/2011 | Krenz et al. | |

FOREIGN PATENT DOCUMENTS

JP    04128783 A  *  4/1992
JP    2008262264 A  *  10/2008

\* cited by examiner

*Primary Examiner* — Allison W Johnson (57) ABSTRACT

Method is proposed of angular coordinates determination for observer's head relative to three mutually perpendicular axes of fixed (or tied to an object) coordinate system OXYZ (angle of roll, azimuth, elevation angle) by use of measuring system based on light-sensitive sensor with collimating lens fixed relative to coordinate system and LED lasers installed on head-mounted module HMM. Measuring device registers angular coordinates of narrow pencils of rays formed by LED lasers and provides determination of observer's head angular coordinates in real-time. Three angles of HMM can be determined by proposed method while no less than two LED lasers are in lens field of view with angle Δ of set value and direction included between their axes. To provide specified measurement range of observer's head angles exceeding lens field of view LED lasers matrix is installed on HMM containing LED lasers allocated in several horizontal and vertical lines.

5 Claims, 8 Drawing Sheets

METHOD FOR DETERMINATION OF HEAD POSITION RELATIVE TO RECTANGULAR AXES FOR OBSERVER EQUIPPED WITH HEAD-MOUNTED MODULE

BACKGROUND OF THE INVENTION

The method is proposed that provides determination of three angular coordinates characterizing head position of observer equipped with Head-Mounted Module (HMM) relative to the rectangular axes that is tied to the object at that the observer is located.

The purpose of the system by U.S. Pat. No. 6,424,310 and engineering solution are most close to the present method for determination of angular coordinates By the patent the 3D-navigation system is proposed that comprises a couple of devices containing emitter and receiver and one of them is installed on the head and the other is fixed on display monitor installed in front of the observer. Each device has photoelectric matrix with its cells concentrated relative to the normal line and infrared diode emitting the light beams along the normal line inside the cone. The photoelectric matrix is capable to receive IR-radiation from the other device and provides output signals that are specified by intensity distribution of IR-radiation illumination in matrix cells. The matrix signals are used for calculation of the angular coordinates of observer's movable (head-mounted) device relative to the fixed device. The system could be used for interactive 3D-games, for remote control and various other applications, e.g., for flight control in simulator or inside the cockpit or command post of the ship, spacecraft, transport vehicles and etc, for disabled persons in order to provide remote control of PC, motorized wheelchair, prosthesis, and etc., and for performance of control functions in industrial production such as, for example, remote control of machines, CAD systems, in architecture, in medical graphic, virtual reality and other applications.

The proposed method and devices based on it are more effective and universal as compared with U.S. Pat. No. 6,424,410 patent for the reasons of:

The claimed method makes it possible to ensure practically unrestricted measuring range of movable HMM (head-mounted) unit angles relative to the fixed coordinate system (±180° horizontal, vertical, rolling) while the device by U.S. Pat. No. 6,424,410 has a constructive restriction of measuring ranges of movable HMM (head-mounted) unit angles caused by cone vertex angle of beams emitted by LED lasers.

By proposed method only the LED lasers are installed on the movable (helmet-mounted) HMM unit while in the device by U.S. Pat. No. 6,424,410 patent a photoelectric matrixes are installed on this unit besides the emitter that makes the construction of movable unit considerably more complicated and decreases its reliability.

By proposed method the focusing of the rays on CCD is carried out in the form of dot while in the device by U.S. Pat. No. 6,424,410 differences of luminance distributions in certain matrix cells are being analyzed. The error of such method is considerably increased and it is more affected by extraneous illumination influence and its responsively is lower.

SUMMARY OF THE INVENTION

The proposed method of determination of observer's head angular coordinates relative to three mutually perpendicular axes of fixed (or tied to the object) rectangular axes OXYZ ($\phi_X$—angle of rotation relative to the longitudinal axis OX—angle of roll; $\phi_Y$—angle of rotation relative to the vertical axis OY—angle of azimuth; $\phi_Z$—angle of rotation relative to the horizontal axis OZ—elevation angle) is based on application of photosensitive transducer with collimator lens that is fixed relative to coordinate system OXYZ and small LED lasers installed on HMM head-mounted unit and at the same time the photosensitive transducer with collimator lens registers angular coordinates of narrow pencils of light rays formed by LED lasers and makes it possible to carry out real-time determination of observer's head angular coordinates.

According to suggested method TVC (television camera) based on CCD (Charge Coupled Device)-matrix or CMOS (Complementary-symmetry/metal-oxide semiconductor)—matrix is used in measuring unit as a photosensitive transducer in order to register the angular coordinates of narrow pencils of light rays and frame rate of TV scan selection is conditioned by ensuring of achievement of required accuracy and reliability of measurement. The collimating lens (LENS) focused to infinity is used in TVC in order to perform the image from the narrow pencils of light rays emitted by LED lasers in the form of luminous dots in the matrix plane. At the same time the location of each dot on the matrix will correspond with two angular coordinates of appropriate LED lasers axis in the object coordinate system OXYZ determined by formulas $$tg\psi_{\iota Y}=y_\iota/F$$

$$tg\psi_{\iota Z}=z_\iota/F,$$

where $\psi_{\iota Y}$—angle of rotation of LED lasers axis with number $\iota$ around the vertical axis OY;

$\psi_{\iota Z}$—angle of rotation of LED lasers axis with number $\iota$ around the horizontal axis OZ;

$y_\iota$ и $z_\iota$—vertical and horizontal linear coordinates of image of dot from LED lasers with number $\iota$ on TVC matrix plane (OYZ plane in object coordinate system OXYZ);

F—focal distance of the LENS.

The proposed method is based on application of fixed unit of angular coordinates measurement—measuring unit (TVC with LENS) with rectangular shape field of view, for example, and with $\alpha_{TVC}$ (horizontal) and $\beta_{TVC}$ (vertical) size while no less than two LED lasers are installed on the helmet-mounted module HMM with the angle $\Delta$ between their axes of specified size and direction. Due to this it is possible to determine not only angular coordinates of observer's head relative to horizontal and vertical axes ($\phi_Y$, $\phi_Z$), but the angle of roll ($\phi_X$) also.

According to the proposed method LED lasers matrix is installed on the head-mounted module HIM with LED lasers arranged so that they form several horizontal and vertical lines in order to provide specified measurement range of angles defining the observer's head position that exceeds TVC field of view ($\alpha_{TVC} \times \beta_{TVC}$). At the same time in each horizontal line any angle $\Delta_i$ between the axes of two next LED lasers with the numbers i and (i+1) has to be less than TVC horizontal angular field of view and total angular size $\alpha_{LED}$ of horizontal line is $\alpha_{LED}=\Sigma\Delta_i$;

in each vertical line any angle $\Delta_j$ between the axes of two next LED laser with the numbers j and (j+1) has to be less than TVC vertical angular field of view $\beta_{TVC}$ and total angular size of vertical line is $\beta_{LED}=\Sigma\Delta_j$.

The matrix formed of LED lasers arranged on HMM in such way makes it possible to extend the ranges of measurement for horizontal $\Delta_Y$ and vertical $\Delta_Z$ angles defining the observer's head position up to $$\Delta_Y \approx \alpha_{TVC}+\alpha_{LED}$$

$$\Delta_Z \beta_{TVC}+\beta_{LED}$$

It is possible to determine angular coordinates of observer's head position within the horizontal angular range $\Delta_Y$ relative to the fixed coordinate system OXYZ by use of increased virtual horizontal size of LENS (from measuring unit with TVC) entrance pupil due to installation of parallel-sided plate (PL) in front of the LENS that is made of optical glass or acrylic and consisted of flat light dividing components glued to each other so that they create set of vertically oriented and mutually parallel slanted beam splitters.

It is possible to determine angular coordinates of observer's head within vertical angular range $\Delta_Z$ relative to the fixed coordinate system OXYZ by use of increased vertical virtual size of LENS entrance pupil due to installation of second parallel-sided plate PL in front of the first plate PL consisting of flat light dividing components glued together between each other creating the set of mutually parallel slanted beam splitters that are horizontally oriented.

By the proposed method in order to determine all three angular coordinates of observer's head relative to the fixed coordinate system OXYZ two working LED lasers are necessary to be in TVC field of view forming in CCD-matrix plane the TVC image of appropriate number of dots from the narrow pencil of rays emitted by these LED lasers. According to coordinates of indicated dots that have been determined and by use of specified program the processor performs calculation of real-time coordinates of observer's head $\phi_X$, $\phi_Y$, $\phi_Z$ relative to the fixed coordinate system OXYZ.

By the proposed method in order to identify each of two LED lasers working in TVC field of view LED lasers are switched on by turns and namely, the first LED laser is emitting during every even frame of TV scan and the second LED laser—during every odd. Application of such switching mode makes it possible to simplify determining of coordinates of luminous dots formed by laser beams in TVC CCD-matrix plane and provides the improved accuracy and noise immunity of whole system.

By proposed method continuity of determination of observer's head angular position within full specified range of observer's head turning angles is ensured due to the fact that in case the beam of at least one of LED lasers from acting couple is coming up to any horizontal (vertical) edge of TVC field of view then said LED laser is being switched off and the next horizontal (vertical) LED laser located in TVC field of view is being switched on simultaneously.

By the proposed method in order to eliminate noise obstructing the view for observer application of LED lasers emitting within invisible spectral range, for example IR-range (0.8-1.0) is provided.

BRIEF DESCRIPTION OF THE DRAWINGS

A detailed description of the present is followed by reference to the accompanying drawings in which like elements are indicated by like references and numerals.

FIG. 1 (A,B,C) shows scheme of direction measurement of single LED laser axis by use of single TVC.

FIG. 2. (A,C) shows two LED lasers in operation when they are turned so that they make an angle $\Delta$. between each other.

FIG. 8 (A, B) shows variant of realization of the system with measuring module (TVC with two PL) that is installed over observer's head.

DETAILED DESCRIPTION OF PREFERRED EMBODIMENT OF THE INVENTION

Figure 1A:
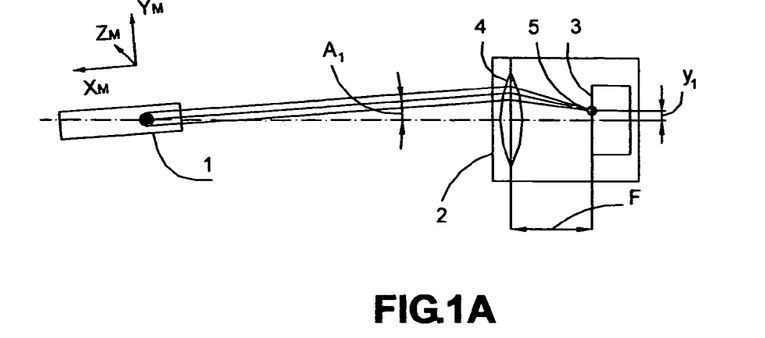
Figure 1B:
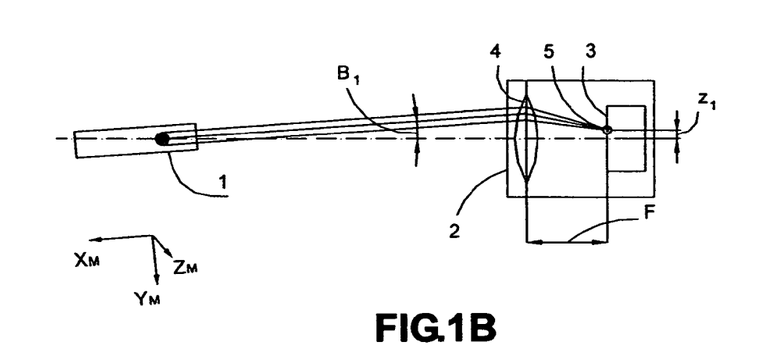
Figure 1C:
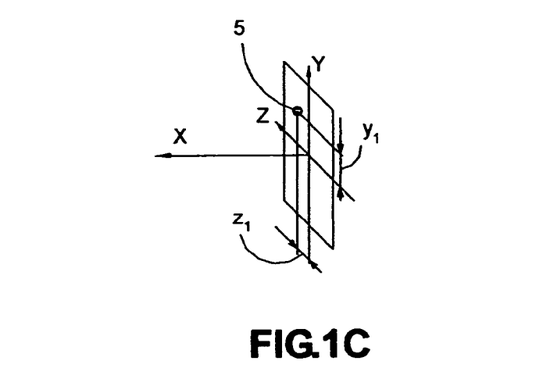

By the proposed method in order to perform measurements of real-time angular coordinates (angle of inclination) of observer's head relative to three mutually perpendicular axes of fixed Cartesian coordinate system OXYZ the application of measuring unit is provided that consists of TVC with LENS installed on a fixed base and matrix LED lasers installed on observer's head-mounted HMM module or on a movable object in which the observer is located. The methodology of measurement of angular coordinates by use of TVC with single or two LED lasers simultaneously is given below in order to describe principle of operation FIG. 1A,B show a scheme of determination of special angular orientation of single LED laser axis (1) by use of single high-precision TVC (2) tied to the fixed coordinates system OXYZ (FIG. 1C). The TVC (2) is built on the basis of CCD-matrix 3 and provided with LENS 4 and its field of view is $\alpha_{TVC} \times \beta_{TVC}$. The narrow pencil of rays emitted by LED laser-1 enters LENS-4 (focused in infinity) and is being focused in the plane of CCD-matrix-3 at the point 5 with a certain linear coordinates $y_1$ and $z_1$ and by use of them it is possible to calculate angular coordinates of LED laser-1 axis relative to the coordinate system OXYZ tied to TVC-2 according to the formulas:

turning angle $A_1$ around the vertical axis OY (angle of azimuth)

$$A_1 = \text{arc } tg(z_1/F);$$

turning angle $B_1$ around the horizontal axis OZ (elevation angle)

$$B_1 = \text{arc } tg(y_1/F),$$

where F—focal distance of LENS-4.

Thereby by use of single LED laser and single TVC it is possible to determine two angular coordinates: azimuth ($\phi_Y = A_1$) and elevation angle ($\phi_Z = B_1$) of movable coordinate system $O_M X_M Y_M Z_M$ tied to a movable object, for example, HMM, relative to the fixed coordinate system OXYZ tied to TVC.

Figure 2A:
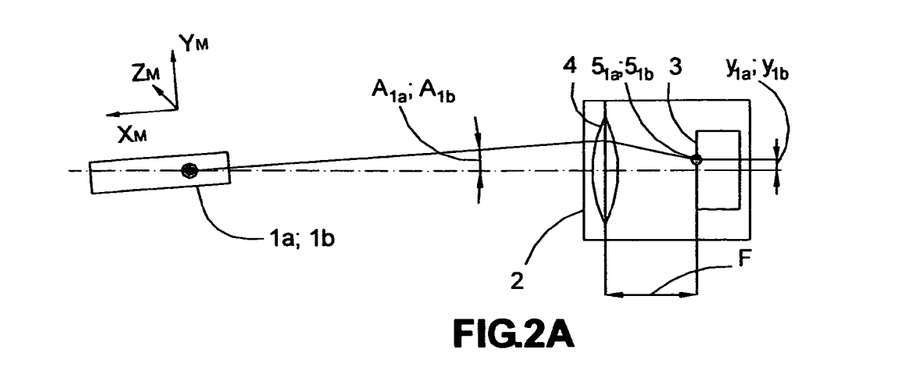
Figure 2B:
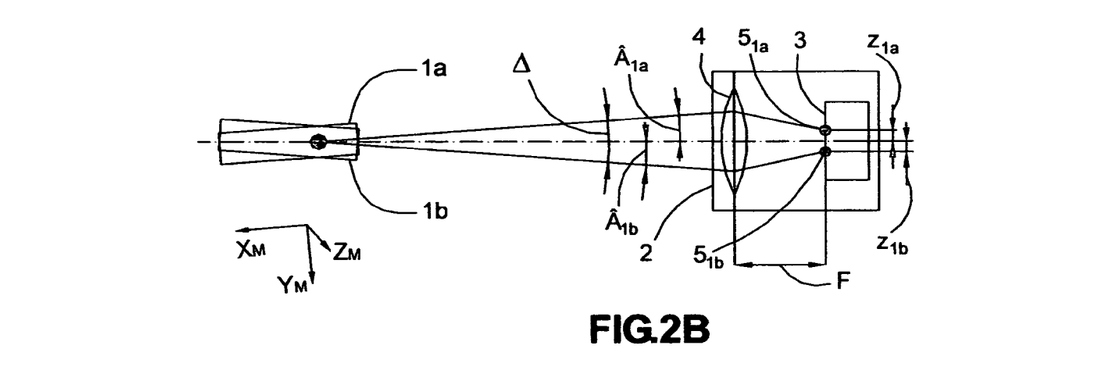
Figure 2C:
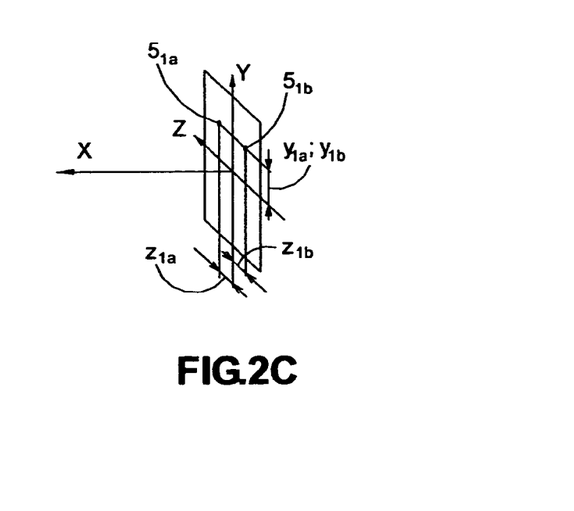

Using FIG. 2A,B,C let us consider operation of two LED lasers (1a и 1b) turned relative to each other by a certain constant angle $\Delta$, for example horizontal. By analogy with above stated formulas it is possible to derive for each of the LED lasers as follows:

for LED laser 1a $$\angle A_{1a} = \text{arc } tg(y_{1a}/F); \angle B_{1a} = \text{arc } tg(z_{1a}/F)$$

for LED laser 1b $$\angle A_{1b} = \text{arc } tg(y_{1b}/F); \angle B_{1b} = \text{arc } tg(z_{1b}/F)$$

FIG. 2A and FIG. 2B shows that there are following relations for images 5a and 5b formed from LED laser 1a and LED laser 1b accordingly:

$$y_{1a} = y_{1b}; \angle A_{1a} = \angle A_{1b}$$

$$z_{1a} = -z_{1b}; \angle B_{1a} = -\angle B_{1b}; \Delta = \angle B_{1b} - \angle B_{1b}$$

Let us take an initial condition by that the axis of LED laser $1a$ (as the main) is coinciding with the direction of $O_M X_M$ axis of movable coordinate system $O_M X_M Y_M Z_M$. In this case $\angle A_{1a}$ is equal to the elevation angle $\phi_Z$ of HMM and $\angle B_{1a}$ is equal to the angle of azimuth $\phi_Y$ of HMM and difference between the angles $\angle A_{1a}$ and $\angle A_{1b}$ is defining the angle of roll $\phi_X$ of HMM that is calculated by the following formula:

$$\phi_X = \arcsin[(\phi_{Z1a} - \phi_{Z1b})/\Delta]$$

In the simplified case that is shown at FIG. 2A,B,C the angle of roll of HMM is zero $$\phi_X = \arcsin[(\phi_{Z1a} - \phi_{Z1b})/\Delta] = \arcsin[(\angle A_{1a} - \angle A_{1b})/\Delta] = 0$$

Therefore the system consisting of two LED lasers and single TVC makes it possible to determine all three angular coordinates of HMM—$\phi_Z$, $\phi_Y$, $\phi_X$.

In order to discern LED laser $1a$ and LED laser $2$ it is suggested to switch on them by turns, for example LED laser $1a$ is switched on during each even frame of TV scan and LED laser $1b$—during each odd frame. At the same time a single luminous dot will be located on CCD-matrix of TVC during each frame and so the determination of it's coordinates will be simplified and improvement of accuracy and noise immunity of the system will be provided accordingly. In order to compensate frequency decrease, for example in half, of obtaining of full information relating to the couple of LED lasers, if necessary, it is possible to change frame rate 60 Hz for 120 Hz that is easy to implement technologically.

By the proposed method in order to provide specified measurement range of angles of observer's head position that exceeds TVC field of view ($\alpha_{TVC} \times \beta_{TVC}$) the matrix of LED lasers is installed on the HMM module with LED lasers arranged so that several horizontal and vertical lines are formed from them. At the same time:

in each horizontal line any angle $\Delta_i$ between axes of two next LED lasers with numbers i and (i+1) has to be less than $\alpha_{TVC}$ horizontal angular field of view of TVC and total angular size $\alpha_{LED}$ of horizontal line is $\alpha_{LED} = \Sigma\Delta_i$;

in each vertical line any angle $\Delta_j$ between axes of two next LED lasers with the numbers j and (j+1) has to be less than $\beta_{TVC}$ vertical angular field of view of TVC and total angular size $\beta_{LED}$ of vertical line is $\beta_{LED} = \Sigma\Delta_j$;

Formed like this the LED lasers matrix that are installed on HMM makes it possible to enlarge horizontal $\Delta_Y$ and vertical $\Delta_Z$ measurement ranges of angles of observer's head position up to:

$$\Delta_Y \approx \alpha_{TVC} + \alpha_{LED}$$

$$\Delta_Z \approx \beta_{TVC} + \beta_{LED}$$

Figure 3:
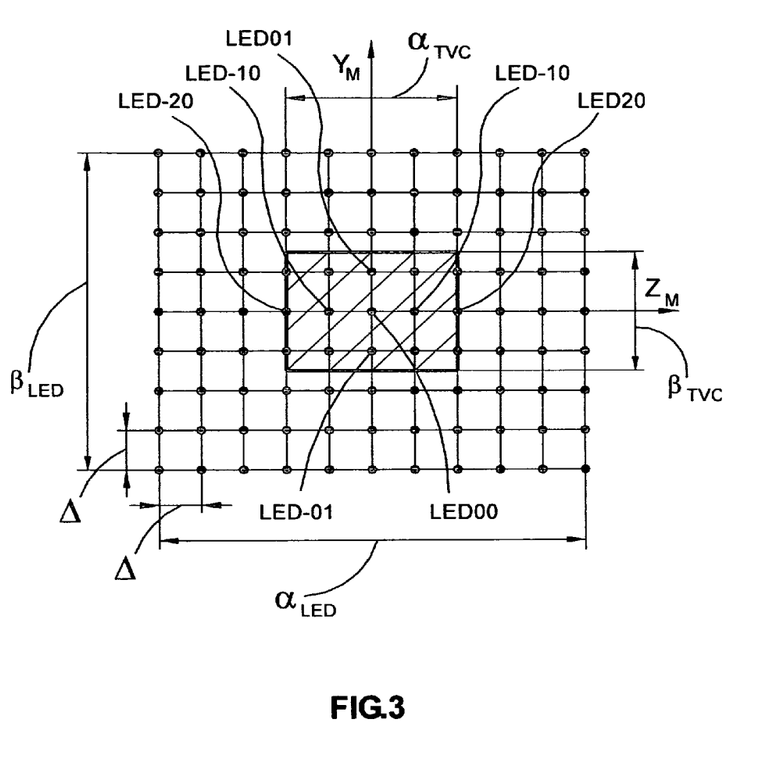
FIG. 3 shows for convenience scheme of TVC field of view and angular size of LED lasers matrix installed, for example, on HMM FIG. 4. illustrates practice of horizontal size enlargement of LENS entrance pupil by use of PL with parallel beam splitters that are vertically oriented.

This solution could be illustrated by FIG. 3, for example, that shows for convenience the rectangular field of view of TVC with $\alpha_{TVC} \times \beta_{TVC}$ size and LED laser matrix installed on HMM with total angular size $\alpha_{LED} \times \beta_{LED}$ and uniform angular spacing $\Delta$ in horizontal and vertical lines (in order to simplify understanding of principle of operation of the method). At the same time axis of LED laser $00$ is coincident with $O_M X_M$ axis of movable coordinate system $O_M X_M Y_M Z_M$ and another LED lasers of horizontal line (containing the LED lasers $00$) are numbered 10, 20, ... etc in positive direction of OZ axis and −10, −20, ... etc in opposite direction and another LED lasers of vertical line (containing the LED laser $00$). are numbered 01, 02, ... etc. in positive direction of $OY_M$ axis and −01, −02, ... etc. in opposite direction. LED lasers are numbered similarly in the rest of the horizontal and vertical lines.

The system operates in following way. In the initial position shown at FIG. 3 there are acting LED lasers:

LED laser $00$ is operative as the main and azimuth $\phi_Y$ and elevation angle $\phi_Z$ are determined by use of it LED lasers $10$ is operative as additional and angle of roll $\phi_X$. is determined by use of it In case of horizontal rotation of the head equipped with HMM, for example, to the left, by the angle less than $0.5\alpha_{TVC}$ the angles $\phi_Y$ and $\phi_Z$ of HMM rotation (taking into account the symbols of FIG. 2A,B,C) is equal to horizontal ($B_{00}$) and vertical ($A_{00}$) angles of the main LED laser $00$ axis accordingly:

$$\phi_Y = \angle B_{00} = \arctan(z_{00}/F)$$

$$\phi_Z = \angle A_{00} = \arctan(y_{00}/F)$$

In this case the HMM angle of roll $\phi_X$ is determined by formula:

$$\phi_X = \arcsin[(\angle A_{10} - \angle A_{00})/\Delta]$$

In case of further horizontal rotation of the head equipped with HMM to the left by the angle $0.5\alpha_{TVC}$ the bordering condition is occur that is: the axis of LED laser $00$ is coming up to the left border of TVC field of view and it is being gone off. At that very moment the LED laser $10$ becomes the main and the LED laser $20$ of this horizontal line is newly switched on as additional one. Then the angles $\phi_Y$, $\phi_Z$ and $\phi_X$ follow the formulas:

$$\phi_Y = \angle B_{10} + \Delta = \arctan(z_{10}/F) + \Delta$$

$$\phi_Z = \angle A_{10} = \arctan(y_{10}/F)$$

$$\phi_X = \arcsin[(\angle A_{20} - \angle A_{10})/\Delta], \text{ etc.}$$

Similar method of approach is correct for the vertical direction of rotation.

Under the rotation of the head equipped with HMM directed, e.g. vertically down, by the angle less than $0.5\beta_{TVC}$ the angles $\phi_Y$, $\phi_Z$ и $\phi_X$ follow the formulas:

$$\phi_Y = \angle B_{00} = \arctan(z_{00}/F)$$

$$\phi_Z = \angle A_{00} = \arctan(y_{00}/F)$$

$$\phi_X = \arcsin[(\angle A_{10} - \angle A_{00})/\Delta]$$

Under further rotation of the head equipped with HMM directed vertically down the bordering condition is occur that is the axis of LED laser $00$ is coming up to the lower border of TVC field of view and it is being gone off. At that very moment the LED laser $01$ is becoming the main one and LED laser $02$ of this vertical line is newly switched on as additional one. Then the angles $\phi_Y$, $\phi_Z$ and $\phi_X$ follow the formulas:

$$\phi_Y = \angle B_{01} + \Delta = \arctan(z_{01}/F) + \Delta$$

$$\phi_Z = \angle A_{01} = \arctan(y_{01}/F)$$

$$\phi_X = \arcsin[(\angle B_{01} - \angle B_{02})/\Delta] \text{ etc.}$$

The above mentioned options of head rotation in only one of directions are simplified cases and application of the method is shown by use of them. In reality there could be head rotations in any directions but the processor performing the control of LED lasers matrix is provided with specified software and has to select optimum option of LED lasers switching in order to provide required continuity and accuracy for the system operation in each "bordering" case.

To fix the idea let us take the real angles for the scheme shown at FIG. 3

$$\alpha_{TVC} \times \beta_{TVC} = 40° \times 30°$$

$$\alpha_{LED} \times \beta_{LED} = 100° \times 60°$$

$$\Delta = 10°$$

The horizontal $\Delta_Y$ and vertical $\Delta_Z$ measurement ranges of angles of observer's head rotation are:

$$\Delta_Y = \alpha_{TVC} + \alpha_{LED} = 40° + 100° = 140°$$

$$\Delta_Z = \beta_{TVC} + \beta_{LED} = 30° + 60° = 90°$$

The foregoing numeral values of angles are not a limit values. By use of proposed method it is possible to provide maximum available measurement ranges ±180° of angles of rotation relative to all three axes for a certain object, e.g. robot (instead of observer) provided with appropriate LED lasers matrix installed, for example, on a ball surface that rotates around the ball center As concerns the HMM specifically it is necessary to note that up-to-date technology makes it possible to integrate LED lasers directly into semitransparent surface of the helmet and so visual noise caused by them is minimized. In addition according to suggested method in order to eliminate the light noise obstructing the view for the observer the application of LED lasers emitting within invisible spectral range, e.g., IR (infrared) is provided.

By the proposed method in order to provide specified horizontal measurement range of observer's head angles $\Delta_Y$ while keeping sufficiently unrestricted linear shifting of observer's head it is suggested to enlarge horizontally the virtual size of entrance pupil of the LENS (ingresses in TVC) by use of installation of parallel-sided (PL) in front of the LENS that is made of optical glass or acrylic and composed of flat light—dividing components glued together between each other creating the set of vertically oriented mutually parallel slanted beam splitters.

Figure 4:
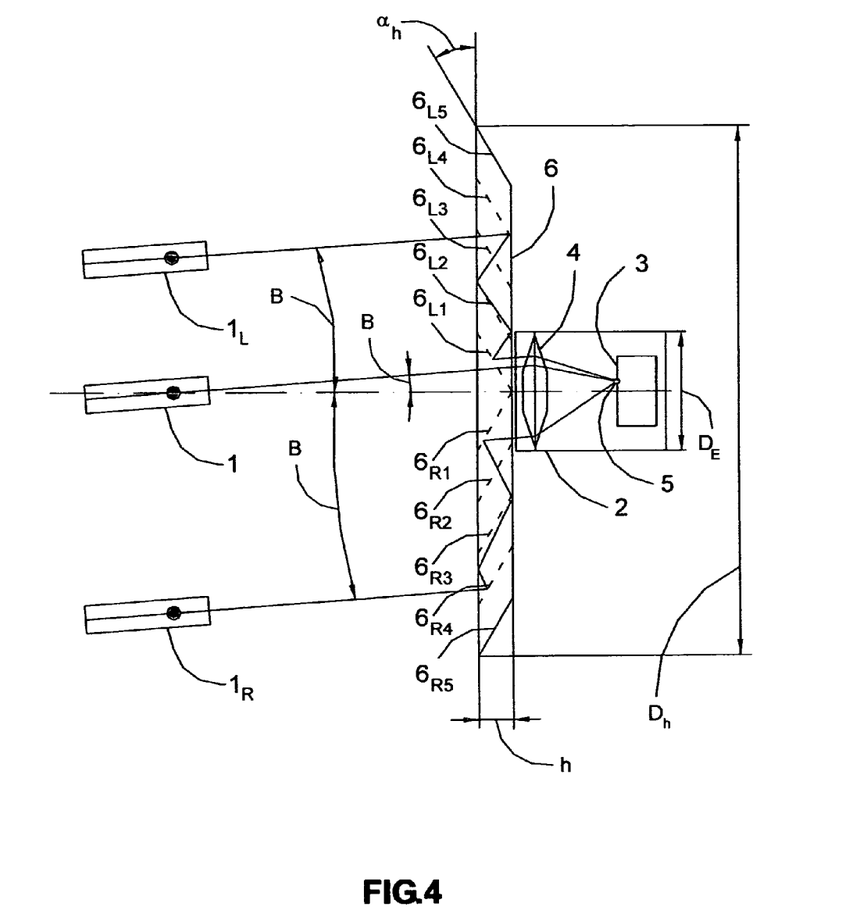

The operation of PL is illustrated by use of FIG. 4, that shows LED laser 1, TVC 2 with CCD-matrix 3 and LENS 4 and also the plate PL 6 in horizontal section. The plate PL 6 contains two groups of vertically oriented mutually parallel beam splitters that are tilted towards input and output facets of the plate. The output parallel beams from the LED laser located in a middle position (1) pass the plate PL 6 angularly at some horizontal angle ∠B through a first beam splitter $6_{L1}$ of the left group (or first beam splitter $6_{R1}$ of the right group) that is located within the limits of the entrance pupil $D_E$ of the objective LENS 4, enter it and are focused on the CCD-matrix 3 at a point 5. Under plate-parallel shifting of LED laser into left position $1_L$ the output parallel beams from it (at a same angle ∠B) enter the plate PL 6 through another beam splitter of the left group, e.g., beam splitter $6_{L4}$, then the beams are partially reflected from the beam splitter $6_{L1}$, and twice fully reflected from exterior surfaces of PL 6 and partially reflected from beam splitter $6_{L1}$, and directed to the entrance pupil $D_E$ and focused at the same point 5 as in case of middle position (1) of LED laser.

Similar approach is correct also for the right position of the LED laser ($1_R$): the output parallel beams from it angularly (at the same angle ∠B) enter the plate PL 6 through the beam splitter of the right group, e.g., beam splitter $6_{R4}$ and they are partially reflected from it and twice fully reflected from the external surfaces of the PL 6 and partially reflected from the beam splitter $6_{R1}$, and directed to the entrance pupil $D_E$ and focused at the same point 5 that in case of middle location (1) of the LED laser.

In order to provide properly functioning PL the beam splitters have to be tilted towards input and output facets by the angle $\delta_h$, that provides total reflection of the beams for even reflections (2-nd, 4-th, etc, counting 1-st reflection from the tilted beam splitter) from input and output facets of PL 3. It is shown by calculations that if widespread optical glass K8 with refractive index n≈1.52 is applied then the angle $\delta_h \approx 27°$ is sufficient to provide the operability of PL 6 within typical horizontal angular field of view $\alpha_{TVC} = 40°$ of TVC 2.

Beam splitters $6_{L1}$ and $6_{R1}$ have to overlap $D_E$ and in order to meet this condition: following relationship has to be implemented:

$$D_E = 2h \cdot ctg\delta_h$$

where h—thickness of horizontal plate PL 6.

Application efficiency of PL 6 could be defined by factor $K_h$, that is equal to ratio of the entrance horizontal light size $D_h$ of the horizontal PL 6 to the entrance pupil $D_E$:

$$K_h = D_h/D_E = D_h/2h \cdot ctg\delta_h$$

$D_h$ is defined by formula:

$$D_h = N_h \cdot h \cdot ctg\delta_h$$

where $N_h$—number of beam splitters (including the last elements $6_{L5}$ and $6_{R5}$).

Then the factor $K_h$ is defined by formula $$K_h = D_h/2h \cdot ctg\delta_h = N_h \cdot h \cdot ctg\delta_h/2h \cdot ctg\delta_h = 0.5N_h$$

For example, if h=10 mm, $\delta_h = 30°$ and $N_h = 10$ then:

$$D_E = 2h \cdot ctg\delta_h = 35 \text{ mm}$$

$$D_h = 10 \cdot 10 \cdot ctg30° \approx 175 \text{ mm}$$

$$K_h = D_h/D_E = 175/35 = 5$$

In order to provide uniformity of intensity of light signal for the light from the LED laser entering the TVC 2 through different elements of the PL 6 (see FIG. 4) lighting parameters of the beam splitters have to meet following conditions:

$$\rho_i = 1/i; \rho_{0.5Nh} = 1/(1 + \rho_{0.5Nh-1})$$

where
$\rho_i$—reflection coefficient of the beam splitter
i—order number of the beam splitter starting from the last (in the left group of PL 6 it is element $6_{L5}$ and in the right group—element $6_{R5}$) to the order number (0.5 $N_h$−1);
$\rho_{0.5Nh}$—reflection coefficient of the middle elements ($6_{L1}$ and $6_{R1}$) with order number 0.5 $N_h$.

For PL 6 with $N_h = 10$ the required reflection coefficients are given in table 1.

TABLE 1

| | Symbols and order number (i) of beam splitter | | | | |
|---|---|---|---|---|---|
| Reflection coefficients | $6_{L1};6_{R1}$<br>i = 5 | $6_{L2};6_{R2}$<br>i = 4 | $6_{L3};6_{R3}$<br>i = 3 | $6_{L4};6_{R4}$<br>i = 2 | $6_{L5};6_{R5}$<br>i = 1 |
| $\rho_i$ | — | 0.25 | 0.33 | 0.5 | 1 |
| $\rho_{0.5Nh}$ | 0.8 | — | — | — | — |

When the light beams are passing through the beam splitter $6_{L1}$ (or $6_{R1}$) the transmittance coefficient of the plate PL 6 is $$\tau_1 = 1 - \rho_5 = 1 - 0.8 = 0.2$$

And further:

under the re-reflecting from the beam splitters $6_{L2}$ and $6_{L1}$ (or $6_{R2}$ and $6_{R1}$)

$$\tau_{21}=\rho_5\rho_4=0.8\cdot 0.25=0.2$$

under the re-reflecting from the beam splitters $6_{L3}$ and $6_{L1}$ (or $6_{R3}$ and $6_{R1}$)

$$\tau_{31}=\rho_5\rho_3(1-\rho_4)=0.8\cdot 0.33(1-0.25)=0.8\cdot 0.33\cdot 0.75\approx 0.2$$

under re-reflection from the beam splitters $6_{L4}$ and $6_{L1}$ (or $6_{R4}$ and $6_{R1}$)

$$\tau_{41}=\rho_5\rho_2(1-\rho_4)(1-\rho_3)=0.8\cdot 0.5(1-0.25)(1-0.33)=0.8\cdot 0.5\cdot 0.75\cdot 0.67\approx 0.2$$

under re-reflection from the beam splitters $6_{L5}$ and $6_{L1}$ (or $6_{R5}$ and $6_{R1}$)

$$\tau_{51}=\rho_5\rho_1(1-\rho_4)(1-\rho_3)(1-\rho_2)=0.8\cdot 1.0(1-0.25)(1-0.33)(1-0.5)=0.8\cdot 0.75\cdot 0.67\cdot 0.5\approx 0.2$$

Thereby under any rays path through the PL 6 they are weakened practically equally (considering the light loss inside the glass≈1% averaged at a ray path length 10 mm as negligible) that is the transmittance coefficient of horizontal plate PL 6 is $\tau_h\approx 0.2$.

Figure 5:
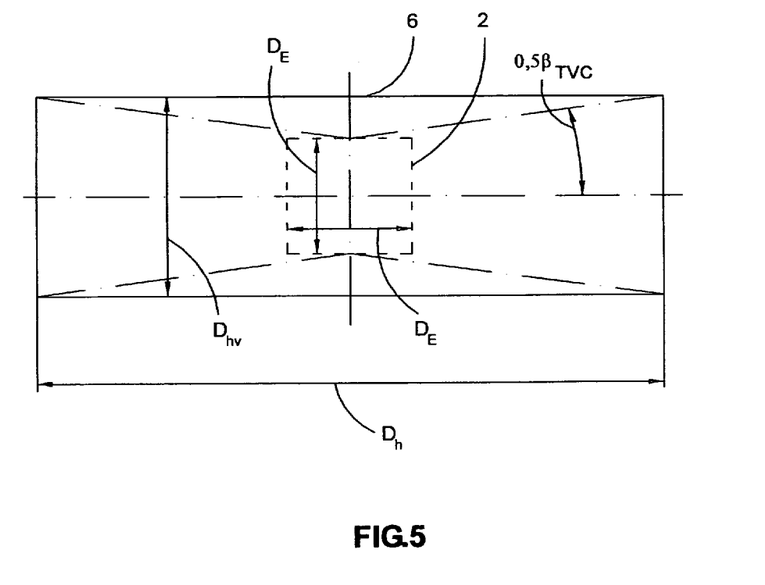
FIG. 5. shows scheme of size determination for PL with vertically oriented beam splitters that are parallel.

In order to provide the effective joint option of LENS 4 and horizontal PL 6 it is necessary for the LENS 4 to have the entrance pupil of squared shape as shown in FIG. 5. The horizontal PL 6 is represented from its input facet with horizontal size $D_h$ and vertical size $D_{hv}$. The LENS 4 entrance pupil with size $D_E\cdot D_E$ (shown by dotted line) is located after the PL 6. The horizontal size of PL 6 is defined by above formula ($D_h=K_h\cdot D_E$) and the vertical size $D_{hv}$ has to exceed $D_E$ so that the rays entering the PL 6 at vertical incidence angles that are within the limits of vertical size of TVC 2 ($\beta_{TVC}$) field of view could get to the LENS 4. In this case it is necessary to meet following condition:

$$D_{hv}\cdot D_E+D_h\cdot tg(0.5\beta_{TVC})$$

With accepted above $\beta_{TVC}=30°$, $D_E=35$ mm and $D_h=175$ we get:

$$D_{hv}=35+175 tg15°\approx 35+47=82\text{ mm}$$

Thus in this case the size of the horizontal PL 6 is 175×82×10 mm and its weight is 0.34 kg approximately.

By the proposed method in order to provide the specified vertical range $\Delta_Z$ of observer's head angles while keeping sufficient free shifting of observer's head it is suggested (see FIG. 6). to increase virtual size of LENS 4 (included into TVC 2) entrance pupil vertically by installation in front of the first PL 6 (horizontal) of the second (vertical) PL 7 consisting of the set of plane light-dividing components that are glued together between each other creating the set of horizontally oriented and mutually parallel slanted beam splitters.

Figure 6:
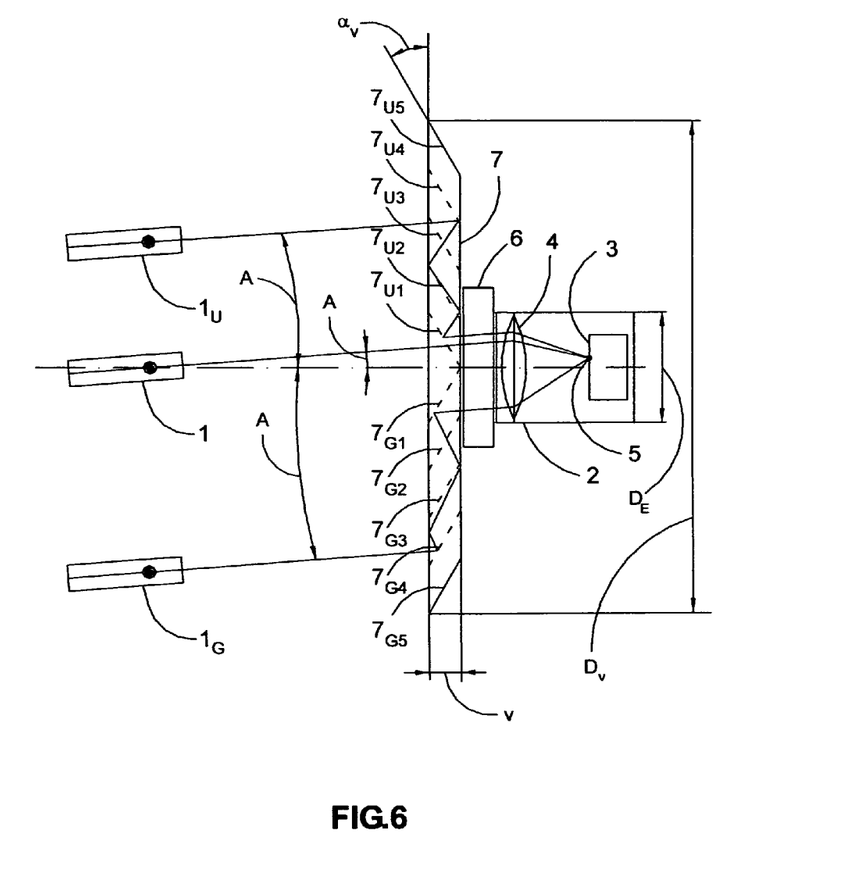
FIG. 6 illustrates practice of vertical size enlargement of LENS entrance pupil by use of PL with parallel beam splitters that are horizontally oriented.

To illustrate the operation of vertical plane PL 7 vertical section of device is shown in FIG. 6. The plate 7 contains two groups of horizontally oriented and mutually parallel beam splitters tilted towards input and output facets of the plate. Parallel beams emitted at a certain vertical angle ∠A by LED laser (1), set in middle position, pass the PL 7 through the first beam splitter $7_{U1}$ from upper group (or first beam splitter $7_{G1}$ from lower group) that is located within the limits of entrance pupil $D_E$, and pass PL 6, LENS 4 and focused on the CCD-matrix 3 in a point 5.

Under plane-parallel shifting of LED laser into upper position LED laser (1$_U$) the parallel beams emitted by it (at a same angle ∠A) enter the plate PL 7 through another beam splitter from the upper group, e.g., beam splitter $7_{U4}$ and they are partially reflected from it and twice fully reflected from external surfaces of PL 7 and partially reflected from the beam splitter $7_{U1}$ and directed into the entrance pupil $D_E$ through the PL 6 and focused in the same point 5 as in case of LED laser set in position 1. Similar approach is correct also for a lower position 1$_G$: parallel beams emitted by the LED laser (at a same angle ∠A) enter the plate PL 7 trough a beam splitter from lower group, e.g. the beam splitter $7_{G4}$ and they are partially reflected from it and twice fully reflected from the external surfaces of PL 7 and partially reflected from the beam splitter $7_{G1}$ and directed into the entrance pupil $D_E$ through the PL 6 and focused in the same point 5 as in case of LED laser set in position 1. In order to provide the properly functioning of PL 7 the beam splitters have to be tilted towards input and output facets by an angle $\delta_v$ that meets the requirements similar to PL 6. It is shown by calculations that by application of optical glass K8 with refractive index n≈1.52 and implementation of the angle $\delta_v\approx 27°$ the PL 7 operability is provided within typical vertical angular field of view $\beta_{TVC}=30°$ of TVC 2.

As the beam splitters $7_{U1}$ and $7_{G1}$ have to overlap $D_E$ following relation should be carried out $$D_E=2v\cdot ctg\delta_v$$

where v—thickness of vertical plate PL 7

Efficiency of PL 7 application could be defined by a factor $K_v$, that is equal to a ratio of input vertical size $D_v$ of the plate PL 7 to the entrance pupil $D_E$:

$$K_v=D_v/D_E=D_v/2v\cdot ctg\delta_v$$

The value of $D_v$ is determined by the formula:

$$D_v=N_v\cdot v\cdot ctg\delta_v$$

Where $N_v$—number of beam splitters (including the last elements $7_{U5}$ and $7_{G5}$) Thus the factor $K_v$ is defined by formula $$K_v=D_v/2v\cdot ctg\delta_v=N_v\cdot v\cdot ctg\delta_v/2v\cdot ctg\delta_v=0.5 N_v$$

For example, given v=10 mm, $\delta_v=30°$ and $N_v=10$ the result is $D_E=2v\cdot ctg\delta_v=35$ mm $$D_v=10\cdot 10\cdot ctg30°\approx 175\text{ mm}$$

$$K_v=D_v/D_E=175/35=5$$

To provide the uniformity of intensity for the light signal from LED laser that is entering the TVC 2 through different elements of PL 7 the beam splitters should meet similar conditions as in case of PL 6, namely:

$$\rho_i=1/i;\rho_{0,Nv}=1/(1+\rho_{0.5Nv-1})$$

Such approach to the transmittance factors of the plate PL 6 is correct for the plate PL 7 also, that is: the transmit tans factor of vertical plate PL 7 is $\tau_v\approx 0.2$. The total transmittance factor $\tau_{h+v}$ of the plates PL 6 and PL 7 with their parameters shown in FIG. 4 and FIG. 6 is:

$$\tau_{h+v}=\tau_v\cdot \tau_h\approx 0.2\cdot 0.2=0.04$$

At the same time uniformity of $\tau_{h+v}$ is at most 20-30% within full field of view and depending on the location on the plates PL 6 and PL 7 that is quite acceptable and could be compensated by dynamic range of TVC sensitivity.

Figure 7:
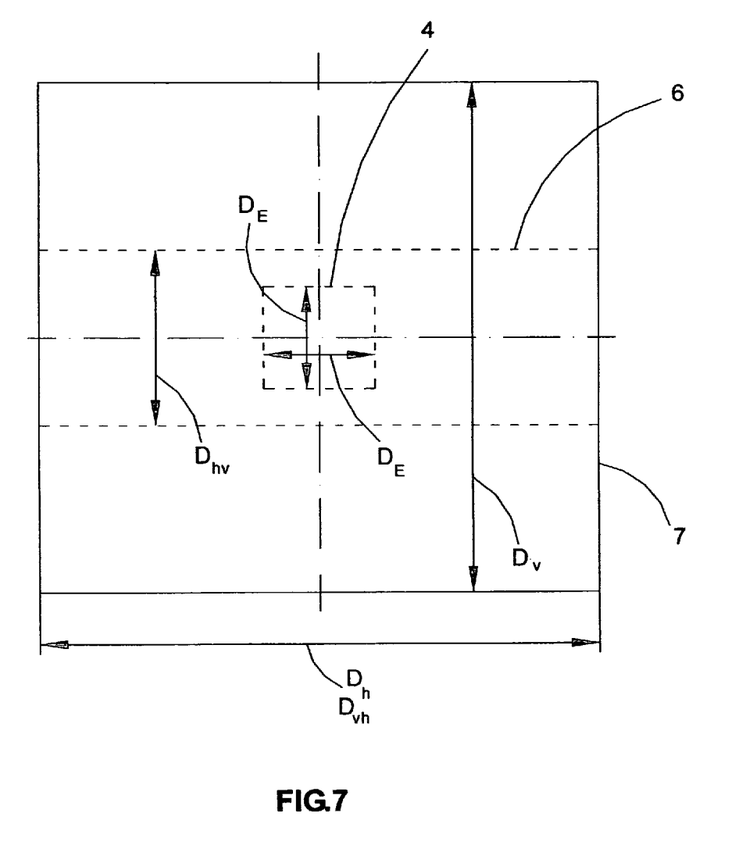
FIG. 7. shows scheme of size determination for PL with horizontally oriented beam splitters that are parallel.

To evaluate the necessary size of vertical PL 7 with horizontally oriented beam splitters let us refer to FIG. 7. PL 7 is shown from the side of its input facet with vertical size $D_v$ and horizontal—$D_{vh}$. The horizontal PL 6 with size $D_h\times D_{hv}$ is installed after it and further the LENS 4 entrance pupil with size $D_E\times D_E$ (shown dotted) is located. The vertical size $D_v$ of the vertical PL 7 is determined by the above mentioned formula ($D_v=K_v \cdot D_E$), and horizontal sizes of both plates PL are equal ($D_{vh}=D_h$).

Consequently in the case under consideration the sizes of vertical PL 7 are 175×175×10 mm and weight is approximately 0.7 kg.

By use of two PL with mutually perpendicular beam splitters it is possible to extend the area of "picking-up" of the rays from LED laser matrix both vertically and horizontally up to any required sizes ($D_{vh} \times D_v$). Similarly to any systems a restriction is imposed by radiated energy of LED laser and sensitivity and dynamic range of TVC 2 and allowable size and weight of the LED lasers matrix when installing on HMM.

Figure 8A:
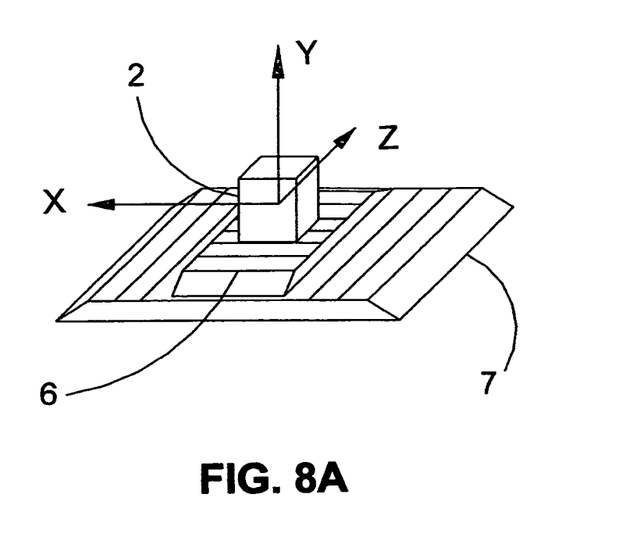
Figure 8B:
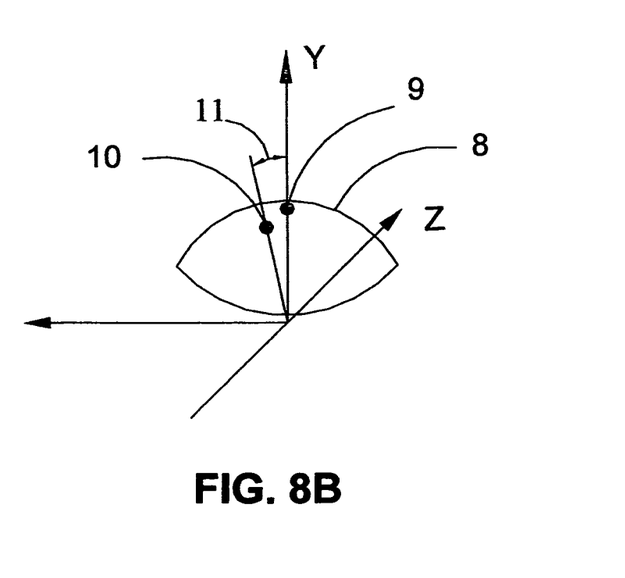

It should be noted that orientation of the system [LED lasers matrix+TVC+PL couple (with mutually perpendicular beam splitters)] relative to the HMM has been accepted for convenience in foregoing description in order to simplify consideration of the proposed method. Principles of operation remain the same under any initial angular location of the measuring system relative to the HMM. For example, according to the scheme shown in FIG. 8A,B an optical axis of TVC 2 is parallel to OY axis of fixed coordinate system OXYZ and first PL 6 and second PL 7 are installed in front of TVC 2 and their input facets are horizontal. The LED lasers matrix is installed on HMM 8 and one of the LED lasers (9) is similar to LED laser 00, the second (10) is similar to LED 10, and an angle (11) included between them is similar to the angle Δ shown in FIG. 3.

It should be noted that with such layout:

HMM 8 angle $\phi_Y$—azimuth can be measured by the system without restrictions) (±180°);

measurement of HMM 8 angle $\phi_Z$—elevation angle should be provided by appropriate parameters of LED lasers matrix and PL 7 sizes;

measurement of HMM 8 angle $\phi_X$—angle of roll should be provided by appropriate parameters of LED lasers matrix and PL 6 sizes In addition an important advantage is provided by installation of measuring devices over the observer's head (equipped with HMM 8): there are no any non-transparent obstacles in the observer's line of sight.

ADVANTAGES OF THE INVENTION

The proposed method for determination of angular coordinates of observer's head relative to three mutually perpendicular axes of fixed (or tied to the object) rectangular axes OXYZ (angle of rotation $\phi_X$ around the longitudinal axis OX—angle of roll, angle of rotation $\phi_Y$ around the vertical axis OY—azimuth, angle of rotation $\phi_Z$ around the horizontal axis OZ—elevation angle)) is based on application of highly sensitive TVC with collimating objective LENS fixed relative to coordinate system OXYZ and miniature LED lasers installed on a helmet-mounted module and TVC registers coordinates of narrow light beams formed by LED lasers and so makes it possible to determine the angular coordinates of observer's head in real-time mode.

The proposed method for determination of angular coordinates of observer's head has a number of advantages:

due to application of LED lasers matrix with specified number of lines and columns that is installed on head-mounted module HMM it is possible to measure angular parameters of HMM within wide range of their variation: in horizontal plane—0°-360° and in vertical plane—no less than ±90°;

computational approach is applied in order to determine the angle of roll instead of instrumental method that is more rational because two LED lasers are constantly located and available in the field of view of measuring device for angular coordinates determination and these LED lasers are installed so that they are turned relative to each other with fixed angle included between them and also azimuth and angles of elevation of these LED lasers are used for determination of angles of roll.

According to the proposed method of angular coordinates measurement the measuring device (TVC) is used with angular field of view less than range of horizontal and vertical variations of HMM module angular coordinates. Therefore it is possible to improve accuracy and reliability of angular coordinates measuring significantly and at the same time to optimize size of TVC depending on specific conditions of application of the method.

According to proposed method of angular coordinates determination the effective methodology of catching of light beams' radiation emitted by LED lasers towards the TVC is used by means of application of two plane-parallel plates with mutually perpendicular multipart beam splitters allocated in front of collimating objective (LENS) contained in TVC that is equivalent to enlargement of virtual size of LENS entrance pupil.

The proposed method for determination of angular coordinates of observer's head is universal and can be used in various fields such as: astronomy, astronautics, aviation—object control systems in guidance and aiming systems, simulators of different purpose, sophisticated computer games, cinematography, development of complex and particularly complex systems, control systems for sophisticated production, etc, by providing capability of measuring of two or three angular coordinates (as required) defining the observer's head position in real-time mode.

What is claimed:

1. A method for determination of angular coordinates of the head for an observer equipped with a head-mounted module (HMM) relative to fixed rectangular axes OXYZ the method comprising:

determining vertical and horizontal angular coordinates of the observer's head in real-time relative to fixed horizontal axis OZ and fixed vertical axis OY using a first emitter and a device for measuring angular coordinates of the first emitter, wherein the first emitter is installed on the HMM and emits a narrow pencil of rays and the device for measuring angular coordinates is stationary relative to the fixed rectangular axes OXYZ wherein the device for measuring angular coordinates comprises a TV camera (TVC) provided with a lens generating a dot pattern of emitter light rays in a plane of a light-sensitive sensor, an optic axis of the lens is parallel to the axis OX, the plane of the light-sensitive sensor is parallel to the vertical plane YOZ, and values of horizontal and vertical angular coordinates of the first emitter are unambiguously connected with values of linear coordinates of the corresponding dot pattern of light rays of the first emitter in the plane of the light-sensitive sensor;

and determining a value of a roll angular coordinate of the observer's head in real-time using a second emitter, wherein a roll angular coordinate is an angle of rotation relative to the third axis OX, the second emitter is installed on the HMM in addition to the first emitter and is turned by a specified angle relative to the first, the value of the roll angular coordinate relative to the axis OX is defined by the arcsine of the difference of vertical angular coordinates of the first and second emitters divided by the value of the specified angle and values of the horizontal and vertical angular coordinates of the first and second emitters are unambiguously connected with values of linear coordinates of corresponding dot patterns of light rays of the first and second emitters in the plane of the light-sensitive sensor, whereas in order to provide the required angular ranges exceeding the TVC angular field of view when measuring the horizontal and vertical angles of observer's head rotation an emitter matrix is installed on the head-mounted module HMM with emitters allocated so that they form several horizontal and vertical lines with specified spacing between the emitters and each of the emitters is turned by the specified angle relative to the next emitters, wherein in order to provide continuous processing when measuring the angular coordinates of the observer's head within a full range of angles, when one emitter from the first and second emitters currently being used to determine angular coordinates of the observer's head is coming up to any border of the TVC's field of view horizontally, then the one emitter is switched off and simultaneously a next horizontal emitter located in the TVC's field of view is switched on; and when one emitter from the first and second emitters currently being used to determine angular coordinates of the observer's head is coming up to any border of the TVC's field of view vertically, then the one emitter is switched off and simultaneously a next vertical emitter located in the TVC's field of view is switched on.

2. A method for determination of angular coordinates of the head for an observer equipped with a head-mounted module (HMM) relative to fixed rectangular axes OXYZ, the method comprising:

determining vertical and horizontal angular coordinates of the observer's head in real-time relative to fixed horizontal axis OZ and fixed vertical axis OY using a first emitter and a device for measuring angular coordinates of the first emitter, wherein the first emitter is installed on the HMM and emits a narrow pencil of rays and the device for measuring angular coordinates is stationary relative to the fixed rectangular axes OXYZ, wherein the device for measuring angular coordinates comprises a TV camera (TVC) provided with a lens generating a dot pattern of emitter light rays in a plane of a light-sensitive sensor, an optic axis of the lens is parallel to the axis OX, the plane of the light-sensitive sensor is parallel to the vertical plane YOZ, and values of horizontal and vertical angular coordinates of the first emitter are unambiguously connected with values of linear coordinates of the corresponding dot pattern of light rays of the first emitter in the plane of the light-sensitive sensor;

and determining a value of a roll angular coordinate of the observer's head in real-time using a second emitter, wherein a roll angular coordinate is an angle of rotation relative to the third axis OX, the second emitter is installed on the HMM in addition to the first emitter and is turned by a specified angle relative to the first, the value of the roll angular coordinate relative to the axis OX is defined by the arcsine of the difference of vertical angular coordinates of the first and second emitters divided by the value of the specified angle and values of the horizontal and vertical angular coordinates of the first and second emitters are unambiguously connected with values of linear coordinates of corresponding dot patterns of light rays of the first and second emitters in the plane of the light-sensitive sensor, wherein in order to extend a range of allowable linear movements of the HMM relative to the stationary TVC in the horizontal direction, a plane-parallel plate PL is installed in front of the lens, the PL made of optical glass or acrylic that consists of a set of flat light-dividing components glued together creating a plurality of mutually parallel slanted beam splitters that are vertically oriented.

3. The method of claim 2, wherein in order to extend a range of allowable linear movements of the HMM relative to the stationary TVC in the vertical direction, a second PL is installed in front of the first PL, the second PL made of optical glass or acrylic that consists of a set of flat light dividing components glued together creating a plurality of mutually parallel slanted beam splitters that are horizontally oriented.

4. The method of claim 3 whereas in the first and second PL the beam splitters are inclined towards the input and output facets of the PLs at an angle, ensuring the fulfillment of the conditions of total reflection of rays for the even reflections from input and output facets.

5. The method of claim 4 whereas in order to improve the efficiency of lens operation with the first and second PL the lens entrance pupil is of a square form and the size of the square is equal to doubled product of value of the PL thickness and cotangent of angle of inclination of beam splitters towards the input and output facets of the PLs.

* * * * *